United States Patent
Syracuse et al.

(10) Patent No.: US 6,982,543 B2
(45) Date of Patent: Jan. 3, 2006

(54) METHODS TO IMPROVE EFFICIENCY OF LITHIUM/SILVER VANADIUM OXIDE CELL DISCHARGE ENERGY IN IMPLANTABLE MEDICAL DEVICE APPLICATIONS

(75) Inventors: Kenneth Syracuse, Williamsville, NY (US); Noelle Waite, Clarence Center, NY (US); Hong Gan, Williamsville, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 131 days.

(21) Appl. No.: 10/775,621

(22) Filed: Feb. 10, 2004

(65) Prior Publication Data

US 2004/0161660 A1    Aug. 19, 2004

Related U.S. Application Data

(60) Provisional application No. 60/446,150, filed on Feb. 10, 2003.

(51) Int. Cl.
*H02J 7/00*    (2006.01)

(52) U.S. Cl. .................. 320/132; 320/133; 320/136
(58) Field of Classification Search ............... 320/127, 320/129, 131–136; 607/4–5, 119, 57
See application file for complete search history.

(56) References Cited

U.S. PATENT DOCUMENTS 5,616,429 A    4/1997    Klementowski

*Primary Examiner*—Michael Sherry
*Assistant Examiner*—Robert Grant
(74) *Attorney, Agent, or Firm*—Michael F. Scalise

(57) ABSTRACT

It is known that reforming implantable defibrillator capacitors at least partially restores and preserves their charging efficiency. An industry-recognized standard is to reform implantable capacitors by pulse discharging the connected electrochemical cell about once every three months throughout the useful life of the medical device. A Li/SVO cell typically powers such devices. The present invention relates to methodologies for accurately determining the precise boundaries of voltage delay and irreversible Rdc growth region in the about 25% to 70% DOD region so that more frequent pulse discharging for the purpose of cell reform is confined to the limits of the region. At the same time, the connected capacitors in the cardiac defibrillator are reformed to maintain them at their rated breakdown voltages.

20 Claims, 1 Drawing Sheet

METHODS TO IMPROVE EFFICIENCY OF LITHIUM/SILVER VANADIUM OXIDE CELL DISCHARGE ENERGY IN IMPLANTABLE MEDICAL DEVICE APPLICATIONS

CROSS-REFERENCE TO RELATED APPLICATION

This application claims priority based on provisional application Ser. No. 60/446,150, filed Feb. 10, 2003.

BACKGROUND OF INVENTION

1. Field of the Invention

The present invention generally relates to the conversion of chemical energy to electrical energy. More particularly, this invention relates to an alkali metal/solid cathode electrochemical cell having reduced voltage delay and irreversible Rdc growth. A preferred couple is a lithium/silver vanadium oxide (Li/SVO) cell. In such cells, it is desirable to reduce voltage delay and permanent or irreversible Rdc growth at about 25% to 70% depth-of-discharge (DOD) where these phenomena typically occur.

2. Prior Art

Voltage delay is a phenomenon typically exhibited in an alkali metal/solid cathode cell, such as of lithium/silver vanadium oxide couple, that has been depleted of about 25% to 70% of its capacity and is subjected to high current pulse discharge applications. It is theorized that vanadium compounds may become soluble in the cell electrolyte from the SVO cathode and be subsequently deposited onto the lithium surface of the anode. The resulting anode surface passivation film is electrically insulating, which leads to cell polarization.

The voltage response of a cell that does not exhibit voltage delay during the application of a short duration pulse or pulse train has distinct features. First, the cell potential decreases throughout the application of the pulse until it reaches a minimum at the end of the pulse, and second, the minimum potential of the first pulse in a series of pulses is higher than the minimum potential of the last pulse.

On the other hand, the voltage response of a cell that exhibits voltage delay during the application of a short duration pulse or during a pulse train can take one or both of two forms. One form is that the leading edge potential of the first pulse is lower than the end edge potential of the first pulse. In other words, the voltage of the cell at the instant the first pulse is applied is lower than the voltage of the cell immediately before the first pulse is removed. The second form of voltage delay is that the minimum potential of the first pulse is lower than the minimum potential of the last pulse when a series of pulses have been applied.

Thus, decreased discharge voltages and the existence of voltage delay are undesirable characteristics of an alkali metal/silver vanadium oxide cell subjected to current pulse discharge conditions in terms of their influence on devices such as implantable medical devices including pacemakers and automatic implantable cardiac defibrillators. Depressed discharge voltages and voltage delay are undesirable because they limit the effectiveness and even the proper functioning of both the cell and the associated electrically powered device under current pulse discharge conditions.

Therefore, there is a need for a lithium/silver vanadium oxide cell that is dischargeable to deliver the high capacity needed for powering implantable medical devices and the like, but that experiences little, if any, voltage delay and irreversible Rdc growth during pulse discharging, especially at about 25% to 70% DOD.

SUMMARY OF THE INVENTION

It is known that reforming implantable defibrillator capacitors at least partially restores and preserves their charging efficiency. An industry-recognized standard is to reform implantable capacitors by pulse discharging the connected electrochemical cell about once every 90 to 180 days throughout the useful life of the medical device. Further, conditioning methodologies for significantly minimizing, if not entirely eliminating, the occurrence of voltage delay and irreversible Rdc growth in the about 25% to 70% DOD region of a Li/SVO cell are known. These conditioning methodologies typically require the cell to be pulse discharged more frequently than that needed for reforming an implantable capacitor. The present invention is directed to determining precisely when to begin and end this more frequent pulse discharging so that cell capacity is preserved.

These and other objects of the present invention will become increasingly more apparent to those skilled in the art by reference to the following description and to the appended drawing.

DETAILED DESCRIPTION OF THE PREFERRED EMBODIMENTS

Figure 1:
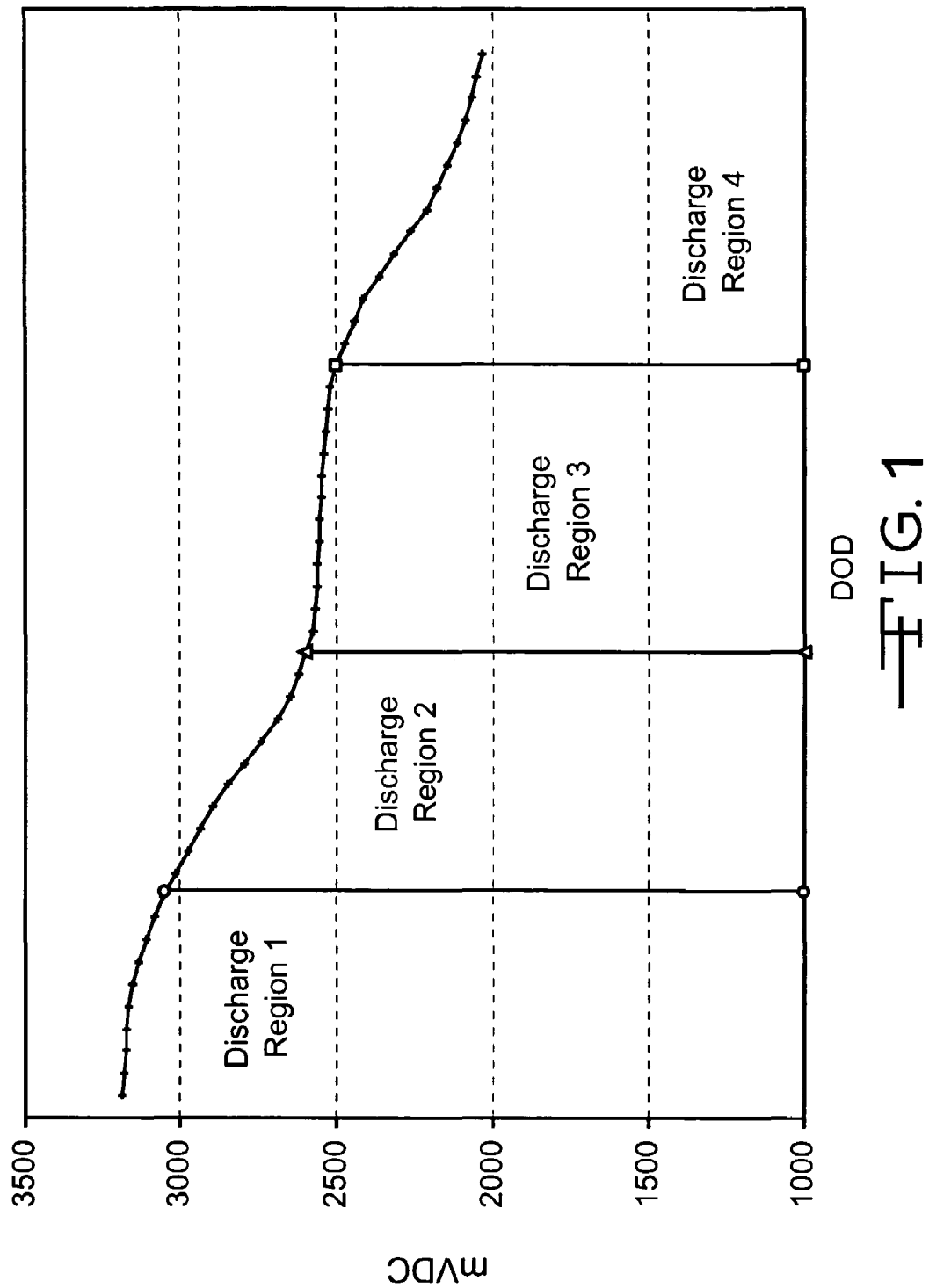
FIG. 1 is a graph illustrating the discharge profile of a typical Li/SVO cell.

The term percent of depth-of-discharge (DOD) is defined as the ratio of delivered capacity to theoretical capacity times 100.

The term "pulse" means a short burst of electrical current of significantly greater amplitude than that of a pre-pulse current or open circuit voltage immediately prior to the pulse. A pulse train consists of at least one pulse of electrical current. The pulse is designed to deliver energy, power or current. If the pulse train consists of more than one pulse, they are delivered in relatively short succession with or without open circuit rest between the pulses. An exemplary pulse train may consist of one to four 5 to 20-second pulses (23.2 mA/cm$^2$) with about a 10 to 30 second rest, preferably about 15 second rest, between each pulse. A typically used range of current densities for cells powering implantable medical devices is from about 15 mA/cm$^2$ to about 50 mA/cm$^2$, and more preferably from about 18 mA/cm$^2$ to about 35 mA/cm$^2$. Typically, a 10 second pulse is suitable for medical implantable applications. However, it could be significantly shorter or longer depending on the specific cell design and chemistry and the associated device energy requirements. Current densities are based on square centimeters of the cathode electrode.

An electrochemical cell that possesses sufficient energy density and discharge capacity required to meet the vigorous requirements of implantable medical devices comprises an anode of a metal selected from Groups IA, IIA and IIIB of the Periodic Table of the Elements. Such anode active materials include lithium, sodium, potassium, and their alloys and intermetallic compounds including, for example, Li—Si, Li—Al, Li—B and Li—Si—B alloys. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably it is a thin metal sheet or foil of the anode metal, pressed or rolled on a metallic anode current collector, i.e., preferably comprising titanium, titanium alloy or nickel. Copper, tungsten and tantalum are also suitable materials for the anode current collector. The anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow a low surface cell design.

The electrochemical cell of the present invention further comprises a cathode of electrically conductive material that serves as the counter electrode. The cathode is preferably of solid materials having the general formula $SM_xV_2O_y$ where SM is a metal selected from Groups IB to VIIB and VIII of the Periodic Table of Elements, and wherein x is about 0.30 to 2.0 and y is about 4.5 to 6.0 in the general formula. By way of illustration, and in no way intended to be limiting, one exemplary cathode active material comprises silver vanadium oxide (SVO) having the general formula $Ag_xV_2O_y$ in either its β-phase having x=0.35 and y=5.8, γ-phase having x=0.74 and y=5.37, or ε-phase having x=1.0 and y=5.5, and combinations of phases thereof.

Another preferred composite cathode active material for primary cells has the general formula $Cu_xAg_yV_2O_z$, (CSVO) and the range of material compositions is preferably about 0.01=x=1.0, about 0.01=y=1.0 and about 5.01=z=6.5. For a more detailed description of this cathode active material, reference is made to U.S. Pat. Nos. 5,472,810 to Takeuchi et al. and U.S. Pat. No. 5,516,340 to Takeuchi et al., both of which are assigned to the assignee of the present invention and incorporated herein by reference. For a silver vanadium oxide or copper silver vanadium oxide cathode, the current collector is preferably of aluminum or titanium with the latter being preferred.

Other useful cathode active materials include manganese dioxide, copper vanadium oxide, titanium disulfide, copper oxide, copper sulfide, iron sulfide, iron disulfide, fluorinated carbon, and mixtures thereof.

Before fabrication into an electrode for incorporation into an electrochemical cell according to the present invention, the cathode active material is preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, stainless steel, and mixtures thereof. The preferred cathode active mixture thus includes a powdered fluoro-polymer binder present at a quantity of at least about 3 weight percent, a conductive diluent present at a quantity of at least about 3 weight percent and from about 80 to about 98 weight percent of the cathode active material.

Cathode components for incorporation into the cell may be prepared by rolling, spreading or pressing the cathode active mixture onto a suitable current collector selected from the group consisting of stainless steel, titanium, tantalum, platinum, nickel, and gold. U.S. Pat. Nos. 4,830,940 and 4,964,877, both to Keister et al., describe manufacturing a cathode by pressing a powdered admixture of SVO, conductive diluent and binder material onto a current collector. U.S. Pat. Nos. 5,435,874 and 5,571,640, both to Takeuchi et al., describe the preparation of a cathode component by an SVO sheeting process. The above Keister et al. and Takeuchi et al. patents are assigned to the assignee of the present invention and incorporated herein by reference. Cathodes prepared as described above may be in the form of one or more plates operatively associated with at least one or more plates of anode material or, in the form of a strip wound with a corresponding strip of anode material in a structure similar to a "jellyroll".

In order to prevent internal short circuit conditions, the cathode is separated from the Group IA, IIA or IIIB anode material by a separator. The separator is of electrically insulative material that is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX® (Chemplast Inc.), a polypropylene membrane commercially available under the designation CELGARD® (Celanese Plastic Company, Inc.), a membrane commercially available under the designation DEXIGLAS® (C.H. Dexter, Div., Dexter Corp.), and a membrane commercially available under the designation TONEN®.

The electrochemical cell of the present invention further includes a nonaqueous, ionically conductive electrolyte serving as a medium for migration of ions between the anode and the cathode electrodes during electrochemical reactions of the cell. The electrochemical reaction at the electrodes involves conversion of ions in atomic or molecular forms that migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive salt dissolved in a mixture of aprotic organic solvents comprising a low viscosity solvent and a high permittivity solvent. In the case of an anode comprising lithium, preferred lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrolidone (NMP), and mixtures thereof. In the present invention, the preferred anode is lithium metal and the preferred electrolyte is 0.8M to 1.5M LiAsF$_6$ or LiPF$_6$ dissolved in a 50:50 mixture, by volume, of propylene carbonate and 1,2-dimethoxyethane.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

A cardiac defibrillator essentially consists of an electrochemical cell as a power source for charging at least one electrolytic capacitor to deliver an electrical shock therapy to the patient's heart. Microprocessors powered by the cell perform heart sensing and pacing. These functions require electrical current of about 1 microampere to about 100 milliamperes. From time-to-time, the cardiac defibrillator may require a generally high rate, pulse discharge load component that occurs, for example, during charging of a capacitor in the defibrillator for the purpose of delivering an electrical shock therapy to the heart to treat tachyarrhythmias, the irregular, rapid heartbeats that can be fatal if left uncorrected. This requires electrical current of about 1 ampere to about 4 amperes.

As shown in FIG. 1, the background discharge profile of a typical Li/SVO cell consists of four regions: regions 1 and 3 are referred to as the plateau regions while regions 2 and 4 are transition regions. Lithium/silver vanadium oxide cells generally have stable internal resistance (Rdc) in regions 1 and 2. Irreversible Rdc growth and voltage delay are not typically observed until the latter parts of region 2 to the middle part of region 3, and may be a function of cathode processing. This correlates to about 25% to 40% DOD, as previously discussed. Therefore, it is beneficial to modify the discharge regime prior to the actual occurrence of observable voltage delay and irreversible Rdc. This is in order to prevent or, at the very least, ameliorate their severity. It then becomes important to accurately locate the onset and end points of voltage delay and irreversible Rdc. When cathodes are prepared from an SVO powder process as described in the previously referenced Keister et al. patents, the initiation point of irreversible Rdc growth and voltage delay is typically found at the beginning of region 3, or around a background voltage of about 2.6V. When SVO cathodes are prepared using the sheet process of the previously referenced Takeuchi et al. patents, initiation of irreversible Rdc growth and voltage delay are typically found in the middle of region 2, or at a background voltage in the range of about 2.8V to 2.9V.

In automatic implantable cardiac defibrillator applications, one very important parameter is the charge time to achieve a pre-determined energy for therapy delivery. In other words, the time to charge a capacitor to a required voltage is affected by voltage delay and Rdc growth. A typical automatic implantable cardiac defibrillator requires energy in the range of from about 20 Joules to about 90 Joules per Li/SVO cell for electrical shock therapy. The relationship is shown below:

$$\text{Energy}(J) = I(\text{amp}) \times V(\text{volt}) \times t(\text{sec.}) \quad t(s) = \text{Energy}(J)/IV$$

If the required delivered energy (J) and pulsing current (amp) are both defined, then the charge time in seconds is inversely proportional to the average voltage under pulsing. Therefore, to maintain a relatively low charge time, the cell must deliver higher voltage under pulsing. This requirement is, however, compromised by the voltage delay and irreversible Rdc growth phenomena in the Li/SVO system at the middle of discharge life region 2 (starting at about 25% DOD). Under severe conditions, cell voltage under pulsing becomes so low that the charge time is considered too long for the required therapy. This results in shortened device longevity. Since voltage delay and irreversible Rdc growth start at about 25% to 40% DOD, it is possible that only about 25% of the theoretical capacity of a particular Li/SVO cell (regions 1 and 2) is actually delivered. The remaining capacity (regions 3 and 4) is wasted, which translates into a shorter device service life.

Not only do Li/SVO cells experience voltage delay and irreversible Rdc growth problems at about 25% DOD, but electrolytic capacitors can experience degradation in their charging efficiency after long periods of inactivity. It is believed that the anodes of electrolytic capacitors, which are typically of aluminum or tantalum, develop microfractures after extended periods of non-use. These microfractures consequently result in extended charge times and reduced breakdown voltages. Degraded charging efficiency ultimately requires the Li/SVO cell to progressively expend more and more energy to charge the capacitors for providing therapy.

To repair this degradation, microprocessors controlling the automatic implantable cardiac defibrillator are programmed to regularly charge the electrolytic capacitors to or near a maximum-energy breakdown voltage (the voltage corresponding to maximum energy) before discharging them internally through a non-therapeutic load. The capacitors can be immediately discharged once the maximum-energy voltage is reached or they can be held at maximum-energy voltage for a period of time, which can be rather short, before being discharged. These periodic charge-discharge or charge-hold-discharge cycles for capacitor maintenance are called "reforms." Reforming automatic cardiac implantable defibrillator capacitors at least partially restores and preserves their charging efficiency.

An industry-recognized standard is to reform implantable capacitors by pulse discharging the connected electrochemical cell about once every 90 to 180 days throughout the useful life of the medical device, which is typically dictated by the life of the cell. However, during the voltage delay and irreversible Rdc growth region at about 25% to 70% DOD, it is desirable to pulse discharge the Li/SVO cell at a more frequent rate. The consequence is that more useful energy is expended for non-therapeutic applications by these more frequent pulse discharges. Thus, the basis for the present invention is driven by the desire to substantially reduce, if not completely eliminate, voltage delay and irreversible Rdc growth in a Li/SVO cell while at the same time periodically reforming the connected capacitors to maintain them at their rated breakdown voltages. This means that accurately locating the onset and the end of the voltage delay and irreversible Rdc growth region in Li/SVO cells so that the automatic implantable cardiac defibrillator can precisely delineate the boundaries of these phenomena increases cell longevity.

Applying high current pulses more frequently than is required to reform the capacitor anode within the irreversible Rdc growth and voltage delay region is referred to as cell or battery reform. This comprises discharging the cell to deliver a pulse train at least about once every eight weeks, and up to as frequently as about once every day. Current pulsing preferably consists of periodic pulse trains of one to four 10-second 2 to 3 amp pulses (15 MA/cm$^2$ to 50 mA/cm$^2$). If there is more than one pulse in a train, the pulses are separated from each other by a 15 seconds rest. More preferably, the cell delivers a pulse train about once every four weeks during battery reform. By applying frequent current pulsing, the anode surface film, which causes cell impedance growth, is removed more efficiently, thus slowing the growth of internal resistance.

When the initiation point of the voltage delay and irreversible Rdc growth region lies within or near the end of a transition zone, i.e., at the end of region 2 and the beginning of region 4, it is fairly easy for the device circuit to recognize its onset within a few milliamp-hours of capacity. However, when the end of the voltage delay and irreversible Rdc zone is located on a plateau, it is far more difficult for the circuitry to determine the exit point.

A first method to determining the initiation and exit points of the irreversible Rdc growth region is through monitoring the background voltage. The background voltage is the voltage reading under the quiescent or background current. By understanding the relationship between capacity, background current and background voltage for a given cell technology, the length of the irreversible Rdc growth region can be solved using the background running voltages. However, if the device circuitry's ability to determine the end point voltage is poor, other methodologies have to be used.

According to the present invention, a second method to determine the start and end points for the irreversible Rdc growth region is to accumulate cell discharge capacity. Because % DOD is the ratio of delivered capacity to theoretical capacity, the capacity at the irreversible Rdc initiation point is defined as $DOD_1$ and the end point as $DOD_2$ for a particular cell design. Then, the device circuitry is programmed to start cell reform by increasing at $DOD_1$ voltage the frequency at which the cell is pulse discharged in respect to that previously described as required for capacitor reform and stop the cell reform after the capacity ($DOD_2 - DOD_1$) has been accumulated.

For example, if the $DOD_1$ and $DOD_2$ are known, the device is programmed to start the battery reform at $DOD_1$ capacity and stop the battery reform at the $DOD_2$ capacity based on the total capacities removed from the cell.

$$C_{DOD1} = DOD_1 \times C_t$$

$$C_{DOD2} = DOD_2 \times C_t$$

$C_{DOD1}$ is the capacity (Ah) at the beginning of the Rdc growth region ($DOD_1$).

$C_{DOD2}$ is the capacity (Ah) at the end of the Rdc growth region ($DOD_2$).

$C_t$ is the theoretical capacity of the cell (Ah).

Thus, assuming the device circuitry can track the total capacity being removed from the cell at any given time, the cell reform process is initiated when the circuitry detects capacity ($C_{DOD1}$) at $DOD_1$. Detecting capacity ($C_{DOD2}$) at $DOD_2$ causes the cell reform process to be discontinued. As a result, the optimized deliverable energy from the Li/SVO cell is achieved.

A third method for determining the start and end points for the voltage delay and irreversible Rdc growth region is to accumulate the time spent in that region. Again, initiation of irreversible Rdc capacity is defined as $DOD_1$ and the end point as $DOD_2$. The device circuitry is then programmed to begin reforming the Li/SVO cell at $DOD_1$ voltage and to discontinue cell reform after the predetermined time has elapsed.

Since different generation devices from various manufacturers use Li/SVO cells in a variety of sizes, geometries and capacities, the time in the voltage delay and irreversible Rdc zone for different devices is not likely to be the same. However, based on some specific parameters in device usage and in specific cell designs, the total time spent within the irreversible Rdc growth zone is computed as follows:

$$T = (DOD_2 - DOD_1) \times C_t / [24 \times I_b + C_p / D],$$

Where,

T is the total time needed for cell reform (days).

$DOD_1$ is the depth of discharge of an Li/SVO cell at the beginning of the Rdc growth region (% theoretical capacity).

$DOD_2$ is the depth of discharge of the Li/SVO cell at the end of the Rdc growth region (% theoretical capacity).

$C_t$ is the theoretical capacity of the Li/SVO cell (Ah).

$I_b$ is the device average background discharge current due to the quiescent discharge (Amp).

$C_p$ is the total capacity consumption due to each battery reform high current pulsing event (Ah).

D is the number of days between each battery reform high current pulsing (days).

For example, a Li/SVO cell with a theoretical capacity of about 2.0 Ah is typically used to power an automatic cardiac implantable defibrillator. The average background current for this cell is about 0.00002 Ampere, and each high current pulse removes about 0.007 Ah of capacity. The pulse interval for cell reform is assumed to be 30 days. For Li/SVO cells constructed with sheet cathodes according to the previously discussed Takeuchi et al. patents, it is assumed that $DOD_1$ is about 28% and $DOD_2$ is about 45%. This means that the present cell reform protocol begins at about 28% DOD. Then, the total time the cell needs to be subjected to the cell reform protocol is calculated as:

$$T = (45\% - 28\%) \times 2.0 / [24 \times 0.00002 + 0.007/30] = 477 \text{ days}$$

Accordingly, the exemplary Li/SVO cell used in the hypothetical device needs to be reformed about once every 30 days for about 16 months after its initiation at 28% DOD (determined by background voltage or time count). Delivering current pulses either to the medical device being powered by the cell or to a secondary "dummy" circuit does this. At the end of 16 months, pulse discharging for the purpose of cell reform is no longer needed because the voltage delay and irreversible Rdc region has been left. The remaining cell energy/capacity is reserved for the device function and therapy delivery. It may, however, still be required to pulse discharge the cell about once every 90 to 180 days for the purpose of capacitor reform. This example demonstrates the concept of using time (T) to determine the end point of Rdc growth. By doing so, the deliverable energy of the cell and the longevity of the device can be maximized.

According to the present invention, combinations of the methods are possible as shown in the following table.

| Determine DOD$_1$ | Determine DOD$_2$ |
|---|---|
| Voltage | Voltage |
| Voltage | Accumulate Capacity |
| Voltage | Accumulate Time |
| Accumulate Capacity | Voltage |
| Accumulate Capacity | Accumulate Capacity |
| Accumulate Capacity | Accumulate Time |
| Accumulate Time | Voltage |
| Accumulate Time | Accumulate Capacity |
| Accumulate Time | Accumulate Time |

Therefore, as long as DOD$_1$ and DOD$_2$ for a particular Li/SVO cell system can be determined, the time period for the irreversible Rdc growth region is computed using the above equations. This same principle can also be applied to determine the time needed to reach the DOD$_1$ point by accumulating time, capacity or voltage from 0% DOD to DOD$_1$. In this manner, the region of severe voltage delay and irreversible Rdc growth is by passed. In the remaining discharge regions before about 25% DOD and after about 70% DOD, irreversible Rdc does not grow significantly, which, in turn, translates into higher pulse voltages and shorter charge times. Therefore, at least 25%+30+%=55+% of theoretical capacity is deliverable as useful energy, instead of just 25% to 40% of theoretical capacity under the traditional discharge regime in the worst case.

It is appreciated that various modifications to the present inventive concepts described herein may be apparent to those of ordinary skill in the art without departing from the scope of the present invention as defined by the herein appended claims.

What is claimed is:

1. A method for powering an implantable medical device with an electrochemical cell, the cell comprising an alkali metal anode coupled to a cathode of a cathode active material activated with an electrolyte, comprising the steps of:
   a) powering the implantable medical device with the cell;
   b) monitoring the depth-of-discharge (DOD) of the cell;
   c) predetermining a first depth-of-discharge (DOD$_1$) at which a cell reform protocol will commence with the cell periodically delivering a pulse discharge of electrical current of significantly greater amplitude than that of the background current or an open circuit voltage immediately prior to the pulse discharge;
   d) predetermining a second depth-of-discharge (DOD$_2$) at which the periodic pulse discharges for the cell reform protocol will be discontinued;
   e) upon the cell reaching the predetermined DOD$_1$, commencing the cell reform protocol by discharging the cell to deliver a pulse 1 of electrical current of significantly greater amplitude than that of the background current or an open circuit voltage immediately prior to the pulse 1 discharge;
   f) waiting a time interval;
   g) discharging the cell to deliver a pulse 1+n of electrical current of significantly greater amplitude than that of the background current or an open circuit voltage immediately prior to the pulse 1+n discharge, wherein n≧1; and
   h) discontinuing the cell reform protocol upon the cell having been discharged to DOD$_2$.

2. The method of claim 1 wherein the time interval is about once every day to about once every eight weeks during the cell reform protocol.

3. The method of claim 1 wherein the pulse discharge consists of at least one 5 to 20-second 15 mA/cm$^2$ to 50 mA/cm$^2$ pulse.

4. The method of claim 3 wherein there is at least two pulses separated from each other by about a 10 to 30 second rest.

5. The method of claim 1 including calculating DOD$_1$ based on a predetermined voltage.

6. The method of claim 1 including calculating DOD$_1$ based on an accumulated capacity having been removed from the cell.

7. The method of claim 1 including calculating DOD$_1$ based on an elapsed time period calculated as: T=(DOD$_2$−DOD$_1$)×C$_t$/[24×I$_b$+C$_p$/D], wherein C$_t$ is the theoretical capacity of the cell, I$_b$ is the medical device's average background discharge current, C$_p$ is the total capacity consumption by discharging the cell to deliver a pulse discharge of electrical current of significantly greater amplitude than that of the background current or an open circuit voltage immediately prior to the pulse discharge, and D is the number of days between two successive pulse discharges.

8. The method of claim 1 including calculating DOD$_2$ based on a predetermined voltage.

9. The method of claim 1 including calculating DOD$_2$ based on an accumulated capacity having been removed from the cell.

10. A method for powering an implantable medical device with an electrochemical cell, the cell comprising an alkali metal anode coupled to a cathode of a cathode active material activated with an electrolyte, comprising the steps of:
    a) powering the implantable medical device with the cell;
    b) monitoring the depth-of-discharge (DOD) of the cell;
    c) accumulating a discharge capacity measurement;
    d) upon the cell reaching a predetermined first depth-of-discharge (DOD$_1$) based on the accumulated discharge capacity measurement, commencing a cell reform protocol by discharging the cell to deliver a pulse 1 of electrical current of significantly greater amplitude than that of a pre-pulse current or open circuit voltage immediately prior to the first pulse discharge;
    e) waiting a time interval;
    f) discharging the cell to deliver a pulse 1+n of electrical current of significantly greater amplitude than that of a pre-pulse current or open circuit voltage immediately prior to the second pulse discharge, wherein n≧1; and
    g) upon the cell reaching a predetermined second depth-of-discharge (DOD$_2$) based on the accumulated discharge capacity measurement, discontinuing the cell reform protocol.

11. The method of claim 10 wherein the implantable medical device is programmed to monitor the DOD.

12. The method of claim 10 including discharging the cell to deliver the pulse 1 and pulse 1+n to the implantable medical device or to a secondary load.

13. The method of claim 10 including discharging the cell to deliver about 20 mA/cm$^2$ to about 50 mA/cm$^2$ as the pulse 1 and pulse 1+n discharges.

14. The method of claim 10 including providing the anode comprising lithium and selecting the cathode active material from the group consisting of silver vanadium oxide, copper silver vanadium oxide, manganese dioxide, copper vanadium oxide, titanium disulfide, copper oxide, copper sulfide, iron sulfide, iron disulfide, fluorinated carbon, and mixtures thereof.

15. A method for powering an implantable medical device with an electrochemical cell, the cell comprising an alkali metal anode coupled to a cathode of a cathode active material activated with an electrolyte, comprising the steps of:
   a) powering the implantable medical device with the cell;
   b) monitoring the depth-of-discharge (DOD) of the cell;
   c) predetermining a first depth-of-discharge ($DOD_1$) and an elapsed time period at which a second depth-of-discharge ($DOD_2$) will have been obtained, wherein the elapsed time period is calculated as: $T=(DOD_2-DOD_1) \times C_t/[24 \times I_b+C_p/D]$, wherein $C_t$ is the theoretical capacity of the cell, $I_b$ is the medical device's average background discharge current, $C_p$ is the total capacity consumption by discharging the cell to deliver a pulse discharge of electrical current of significantly greater amplitude than that of the background current or an open circuit voltage immediately prior to the pulse discharge, and D is the number of days between two successive pulse discharges;
   d) upon the cell reaching the predetermined $DOD_1$, commencing a cell reform protocol by discharging the cell to deliver a pulse 1 of electrical current of significantly greater amplitude than that of the background current or an open circuit voltage immediately prior to the pulse 1 discharge;
   e) waiting a time interval;
   f) discharging the cell to deliver a pulse 1+n of electrical current of significantly greater amplitude than that of the background current or an open circuit voltage immediately prior to the pulse 1+n discharge, wherein $n \geq 1$; and
   g) discontinuing the cell reform protocol at the expiration of the elapsed time and the cell having been discharged to $DOD_2$.

16. The method of claim 15 wherein the implantable medical device is programmed to monitor the DOD.

17. The method of claim 15 including discharging the cell to deliver the pulse 1 and pulse 1+n to the implantable medical device or to a secondary load.

18. The method of claim 15 including discharging the cell to deliver about 20 mA/cm$^2$ to about 50 mA/cm$^2$ as the pulse 1 and pulse 1+n discharges.

19. The method of claim 15 including providing the anode comprising lithium and selecting the cathode active material from the group consisting of silver vanadium oxide, copper silver vanadium oxide, manganese dioxide, copper vanadium oxide, titanium disulfide, copper oxide, copper sulfide, iron sulfide, iron disulfide, fluorinated carbon, and mixtures thereof.

20. The method of claim 19 including providing the cathode as either a pressed powder or a free standing sheet of the silver vanadium oxide.

* * * * *